(12) United States Patent
Dmitriyev

(10) Patent No.: US 9,894,085 B1
(45) Date of Patent: Feb. 13, 2018

(54) SYSTEMS AND METHODS FOR CATEGORIZING PROCESSES AS MALICIOUS

(71) Applicant: Symantec Corporation, Mountain View, CA (US)

(72) Inventor: Eduard Dmitriyev, Reseda, CA (US)

(73) Assignee: Symantec Corporation, Mountain View, CA (US)

( * ) Notice: Subject to any disclaimer, the term of this patent is extended or adjusted under 35 U.S.C. 154(b) by 149 days.

(21) Appl. No.: 15/063,533

(22) Filed: Mar. 8, 2016

(51) Int. Cl.
*H04L 29/06* (2006.01)
(52) U.S. Cl.
CPC .......... *H04L 63/1416* (2013.01); *H04L 63/20* (2013.01)
(58) Field of Classification Search
CPC ............. H04L 63/1416; H04L 63/1433; H04L 63/145; H04L 63/14; G06F 21/564; G06F 21/566
USPC .......................................................... 726/1
See application file for complete search history.

(56) References Cited

U.S. PATENT DOCUMENTS

| 7,594,272 | B1  |        | 9/2009 | Kennedy et al. |              |
|-----------|-----|--------|--------|----------------|--------------|
| 9,246,938 | B2  | *      | 1/2016 | Alme           | G06F 21/56   |
| 9,680,847 | B2  | *      | 6/2017 | Alme           | H04L 63/1416 |
| 9,740,862 | B1  | *      | 8/2017 | Quinlan        | G06F 21/562  |
| 2013/0305368 | A1 | *   | 11/2013 | Ford          | G06F 21/568 726/23 |
| 2017/0068815 | A1 | *   | 3/2017  | Lu            | G06F 21/566  |
| 2017/0206357 | A1 | *   | 7/2017  | Gorelik       | G06F 21/566  |

OTHER PUBLICATIONS

Brumley, David, et al. "Automatically identifying trigger-based behavior in malware." Botnet Detection (2008): 65-88.*
Adam Kliarsky, Responding to Zero Day Threats, https://www.sans.org/reading-room/whitepapers/incident/responding-zero-day-threats-33709, SANS Institute InfoSec Reading Room, (Jun. 27, 2011).
William E. Sobel; Systems and Methods for Detecting Malware Infections via Domain Name Service Traffic Analysis; U.S. Appl. No. 14/954,425, filed Nov. 30, 2015.

* cited by examiner

*Primary Examiner* — Syed Zaidi
(74) *Attorney, Agent, or Firm* — FisherBroyles, LLP

(57) ABSTRACT

The disclosed computer-implemented method for categorizing processes as malicious may include (1) storing, in a security application that tracks event data for the computing device, data about an event triggered by an uncategorized process, (2) storing, in the security application, new data about an additional event triggered by an additional process that has not previously been determined to be connected to the uncategorized process, (3) comparing the new data about the additional event with the data about the event to determine whether the additional data shares a common variable with the data, (4) identifying, based on determining that the additional data shares the common variable with the data, a malicious chain of events that comprises the event and the additional event, and (5) categorizing the uncategorized process as malicious in response to identifying the malicious chain of events. Various other methods, systems, and computer-readable media are also disclosed.

20 Claims, 7 Drawing Sheets

SYSTEMS AND METHODS FOR CATEGORIZING PROCESSES AS MALICIOUS

BACKGROUND

Viruses, Trojans, spyware, and other kinds of malware are a constant threat to any computing device that requires network connectivity. Many different types of security systems exist to combat these threats, ranging from browser plug-ins to virus scanners to firewalls and beyond. Countless new instances and permutations of malware are created every day, requiring security systems to be constantly updated. Many security systems look for malware not just on the basis of quickly-outdated signatures, but also by tracking each event initiated by unknown processes in order to determine whether those small events add up to a malicious overall picture.

Unfortunately, malware creators have adapted yet again by creating malware that splits up its suspicious actions among multiple different processes. A malicious process may not take any malicious actions directly but instead may spawn child processes that each generate only a portion of the events needed to accomplish a malicious task, making detection more difficult. Other malware may even use trusted processes to trigger some portion of the necessary events. By splitting up actions in this way, malicious processes may avoid being correctly categorized by traditional security systems that only examine a process's actions in the context of other actions performed by that same process. Accordingly, the instant disclosure identifies and addresses a need for additional and improved systems and methods for categorizing processes as malicious.

SUMMARY

As will be described in greater detail below, the instant disclosure describes various systems and methods for categorizing processes as malicious by comparing event data across multiple processes in order to detect malicious chains of events that are contributed to by multiple processes.

In one example, a computer-implemented method for categorizing processes as malicious may include (1) storing, in a security application that tracks event data for the computing device, data about an event triggered by an uncategorized process on the computing device, (2) storing, in the security application, new data about an additional event triggered by an additional process on the computing device that has not previously been determined by the security application to be connected to the uncategorized process, (3) comparing the new data about the additional event with the data about the event to determine whether the additional data shares a common variable with the data, (4) identifying, based on determining that the additional data shares the common variable with the data, a malicious chain of events that includes the event and the additional event, and (5) categorizing the uncategorized process as malicious in response to identifying the malicious chain of events.

In some examples, the computer-implemented method may further include categorizing the additional process as malicious in response to identifying the malicious chain of events. In one embodiment, the additional process may include a trusted process that has been previously categorized by the security application as non-malicious. In another embodiment, the uncategorized process and the additional process may be child processes of a parent process.

In one embodiment, comparing the new data about the additional event with the data about the event may include using a stateless language to compare the new data against a set of policy rules. In some embodiments, storing the data may include storing the data to a variable in global memory. In some examples, the computer-implemented method may further include undoing at least one of the event and the additional event.

In one embodiment, a system for implementing the above-described method may include (1) a storing module, stored in memory, that stores, in a security application that tracks event data for the computing device, data about an event triggered by an uncategorized process on the computing device and new data about an additional event triggered by an additional process on the computing device that has not previously been determined by the security application to be connected to the uncategorized process, (2) a comparison module, stored in memory, that compares the new data about the additional event with the data about the event to determine whether the additional data shares a common variable with the data, (3) an identification module, stored in memory, that identifies, based on determining that the additional data shares the common variable with the data, a malicious chain of events that may include the event and the additional event, (4) a categorization module, stored in memory, that categorizes the uncategorized process as malicious in response to identifying the malicious chain of events, and (5) at least one physical processor configured to execute the storing module, the comparison module, the identification module, and the categorization module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) store, in a security application that tracks event data for the computing device, data about an event triggered by an uncategorized process on the computing device, (2) store, in the security application, new data about an additional event triggered by an additional process on the computing device that has not previously been determined by the security application to be connected to the uncategorized process, (3) compare the new data about the additional event with the data about the event to determine whether the additional data shares a common variable with the data, (4) identify, based on determining that the additional data shares the common variable with the data, a malicious chain of events that includes the event and the additional event, and (5) categorize the uncategorized process as malicious in response to identifying the malicious chain of events.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
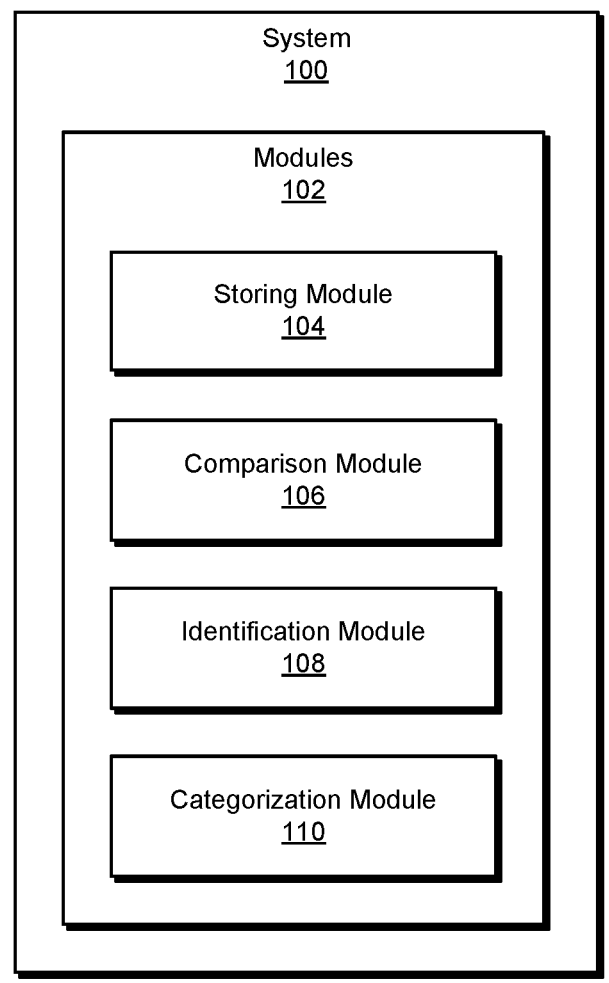
FIG. 1 is a block diagram of an exemplary system for categorizing processes as malicious.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for categorizing processes as malicious. As will be explained in greater detail below, by storing event data and then comparing event data not just to events generated by the same process but also to events generated by different processes, the systems and methods described herein may categorize processes as malicious by determining that the malicious processes contributed to a malicious chain of events. This may allow the systems and methods described herein to identify malicious processes that would otherwise be missed in cases where the malicious process does not initiate any events that would be flagged as malicious if examined in isolation.

Figure 2:
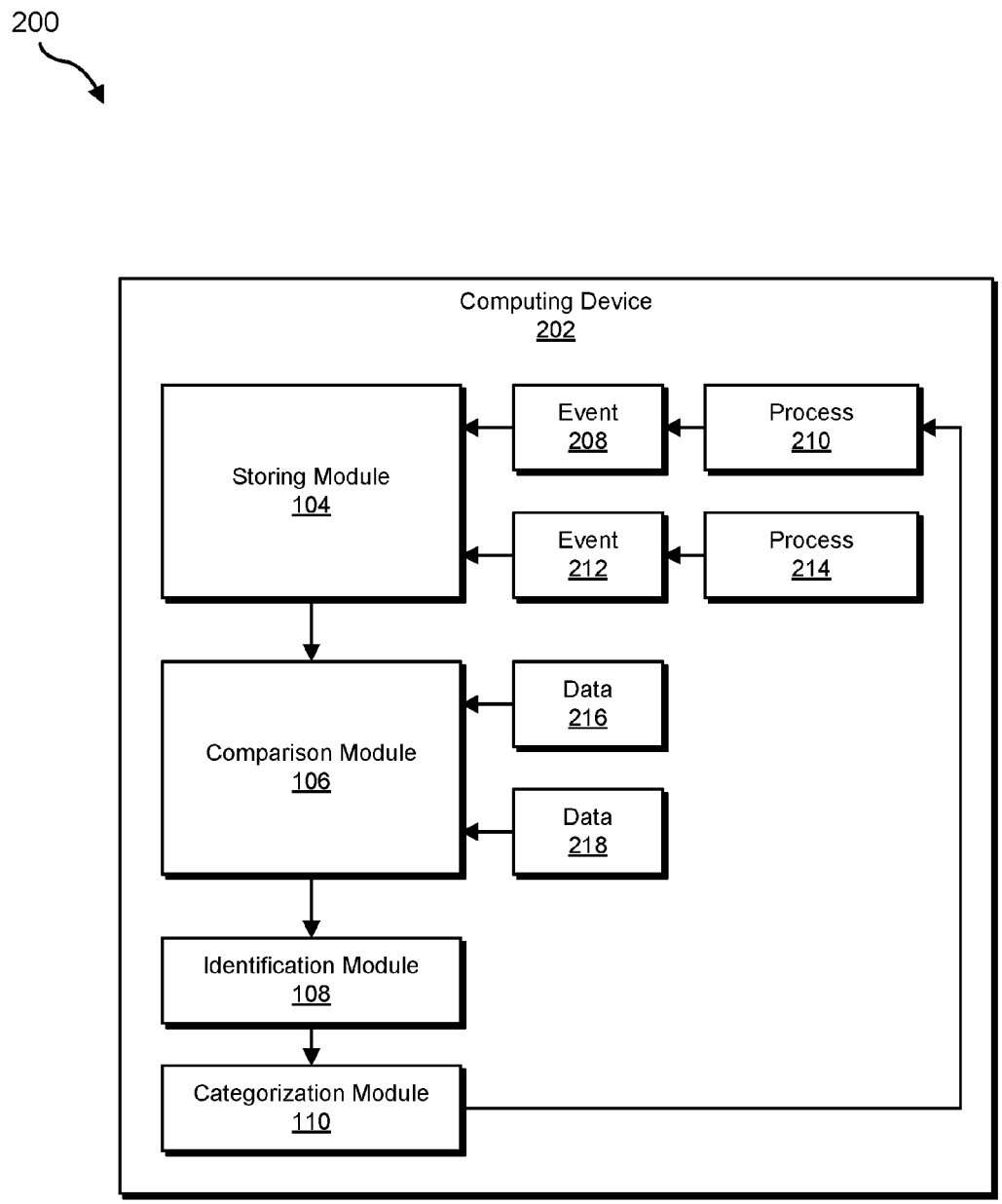
FIG. 2 is a block diagram of an additional exemplary system for categorizing processes as malicious.

The following will provide, with reference to FIGS. 1-2, detailed descriptions of exemplary systems for categorizing processes as malicious. Detailed descriptions of corresponding computer-implemented methods will also be provided in connection with FIG. 3. Detailed descriptions of exemplary event data will be provided in connection with FIG. 4. Additionally, detailed descriptions of exemplary processes will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for categorizing processes as malicious. As illustrated in this figure, exemplary system 100 may include one or more modules 102 for performing one or more tasks. For example, and as will be explained in greater detail below, exemplary system 100 may include a storing module 104 that stores, in a security application that tracks event data for the computing device, data about an event triggered by an uncategorized process on the computing device. Storing module 104 may also store as well as new data about an additional event triggered by an additional process. Exemplary system 100 may additionally include a comparison module 106 that compares the new data about the additional event with the data about the event to determine whether the additional data shares a common variable with the data. Exemplary system 100 may also include an identification module 108 that identifies, based on determining that the additional data shares the common variable with the data, a malicious chain of events that may include the event and the additional event. Exemplary system 100 may additionally include a categorization module 110 that categorizes the uncategorized process as malicious in response to identifying the malicious chain of events. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to categorize processes as malicious. For example, and as will be described in greater detail below, storing module 104 may store, in a security application that tracks event data for computing device 202, data 216 about an event 208 triggered by a process 210 on computing device 202. Before, afterwards, or at the same time, storing module 104 may also store, in the security application, data 218 about an event 212 triggered by a process 214 on computing device 202 that has not previously been determined by the security application to be connected to process 210. When new event data is stored, comparison module 106 may compare data 218 about event 212 with data 216 about event 208 to determine whether data 218 shares a common variable with data 216. Next, identification module 108 may identify, based on determining that data 218 shares the common variable with data 216, a malicious chain of events that may include event 208 and event 212. Finally, categorization module 110 may categorize process 210 as malicious in response to identifying the malicious chain of events.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
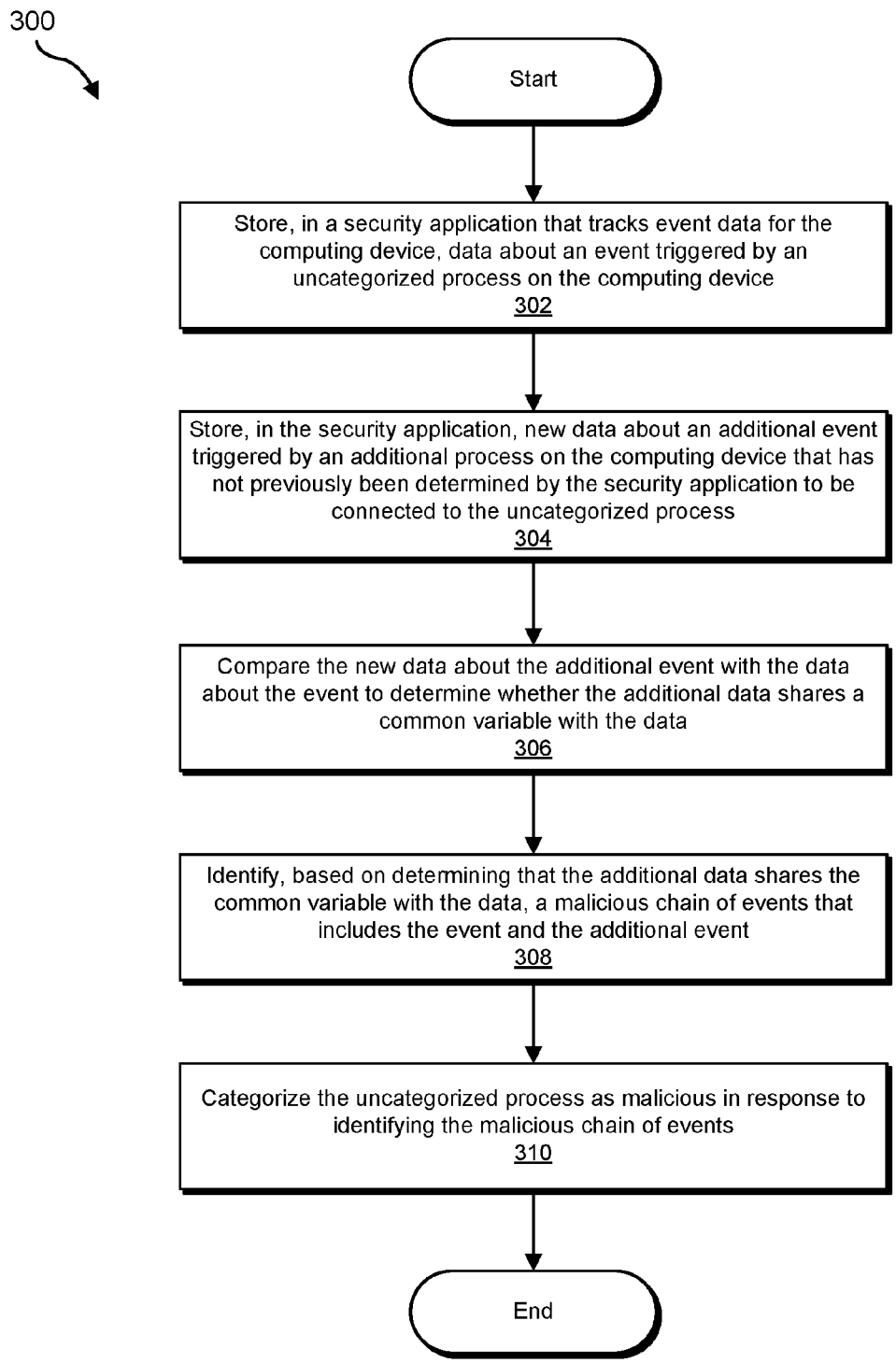
FIG. 3 is a flow diagram of an exemplary method for categorizing processes as malicious.

FIG. 3 is a flow diagram of an exemplary computer-implemented method 300 for categorizing processes as malicious. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302, one or more of the systems described herein may store, in a security application that tracks event data for the computing device, data about an event triggered by an uncategorized process on the computing device. For example, storing module 104 may, as part of computing device 202 in FIG. 2, store, in a security application that tracks event data for computing device 202, data 216 about event 208 triggered by process 210 on computing device 202.

The term "security application," as used herein, generally refers to any application that is capable of storing data about events and/or categorizing processes as malicious or non-malicious. In some embodiments, a security application may store event data for many categories of events on a computing device, compare data from different events, and/or use event data to determine whether or not a process is malicious.

The term "event," as used herein, generally refers to any action or occurrence that takes place on a computing system. In some embodiments, events may be generated by applications, processes, and/or operating systems. Exemplary types of events may include file system events, registry events, and/or process events.

The term "uncategorized process," as used herein, generally refers to any process that has not previously been categorized as malicious. In some embodiments, an uncategorized process may not previously have been categorized at all (e.g., may also not have been categorized as benign and/or non-malicious).

The term "data," as used herein, generally refers to any variable and/or collection of variables that may describe an event. In one example, data about an event may include a name and/or identifier of a process that triggered the event, a target of the event, and/or a timestamp of the event.

Storing module 104 may store the data in a variety of different ways. For example, storing module 104 may store the data to a variable in global memory. In one embodiment, storing module 104 may be part of a security application that may store data from a variety of events in order to detect malicious processes.

At step 304, one or more of the systems described herein may store, in the security application, new data about an additional event triggered by an additional process on the computing device that has not previously been determined by the security application to be connected to the uncategorized process. For example, storing module 104 may, as part of computing device 202 in FIG. 2, store, in the security application, data 218 about event 212 triggered by process 214 on computing device 202 that has not previously been determined by the security application to be connected to process 210.

The term "connected," as used herein, generally refers to any evidence-supported relationship between two processes. For example, a process that downloaded a second process may have previously been determined to be connected to the second process. In another example, if two processes were downloaded from the same source, the two processes may have previously been determined to be connected. Additionally or alternatively, if two processes share the same publisher, the processes may have been previously determined to be connected.

Storing module 104 may store data about the event and the additional event in any order. In some examples, the event may occur before the additional event. In other examples, the additional event may occur before the event. Additionally or alternatively, the event and the additional event may occur simultaneously.

At step 306, one or more of the systems described herein may compare the new data about the additional event with the data about the event to determine whether the additional data shares a common variable with the data. For example, comparison module 106 may, as part of computing device 202 in FIG. 2, compare data 218 about event 212 with data 216 about event 208 to determine whether data 216 shares a common variable with data 218.

Figure 4:
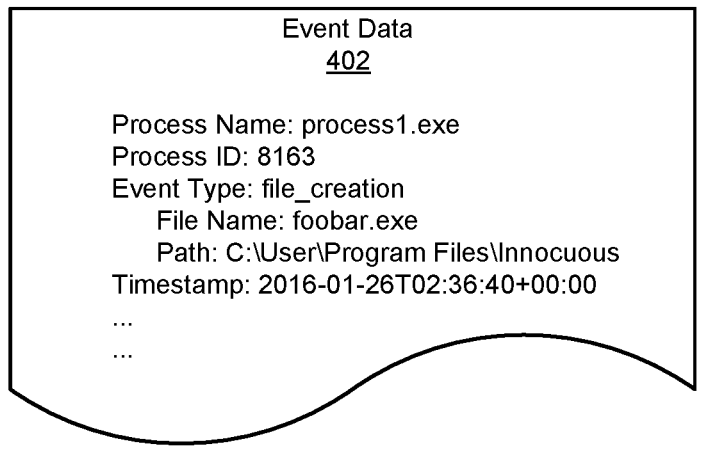
FIG. 4 is a block diagram of exemplary event data.
Figure 4:
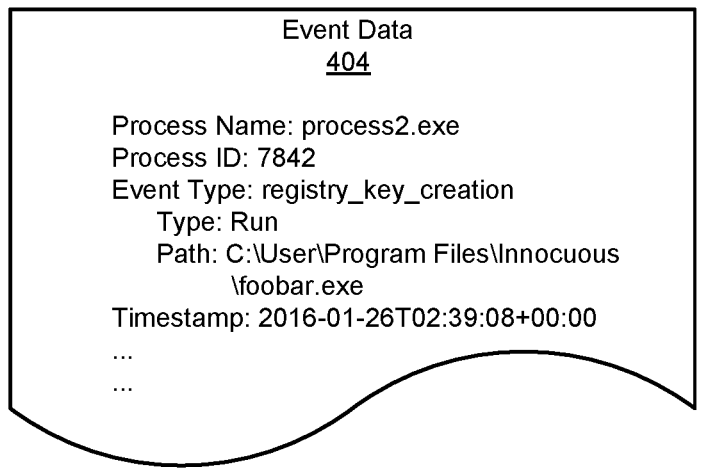

The term "common variable," as used herein, generally refers to any variable or related set of variables that are identical or similar between two sets of event data. For example, if two events target the same process, the process may be the common variable. In another example, if two events target the same file, the file may be the common variable. In some embodiments, the common variable may be a combination of several variables. For example, as illustrated in FIG. 4, event data 402 may be a data record that includes information about a file creation event and/or event data 404 may be a data record that includes information about a registry key creation event. In this example, event data 402 and event data 404 may share a common variable because the file name and path from event data 402 may, when combined, be identical to the path variable from event data 404.

Comparison module 106 may compare the event data in a variety of ways. For example, comparison module 106 may compare the new data about the additional event with the data about the event by using a stateless language to compare the new data against a set of policy rules. In one embodiment, a stateless language may check if certain events are triggered in a pre-defined order with certain event-specific data, which are only available in the context of events.

In one example, one process may create an executable file while another process creates the registry run key value that points to the newly created executable file. In this example, comparison module 106 may compare variables in the global context and detect that the executable file path created by the first process is equal to the run key value created by the second process. In one embodiment, comparison module 106 may make this comparison using rules for a stateless rules engine. The first rule may be triggered on a file creation event in the context of the first process. The second rule may be triggered in the context of the second process on the registry event. Whenever either rule is matched, comparison module 106 may assign a variable to one of the corresponding items of event data and/or generate a special "rule match event" for each of the actor processes. When comparison module 106 generates this special rule match event for the second time, the third rule may be triggered, and, as a result, the signature may be triggered for both of the participating actors. In this example, comparison module 106 may then determine that the two sets of event data share a common variable.

Returning to FIG. 3, at step 308, one or more of the systems described herein may identify, based on determining that the additional data shares the common variable with the data, a malicious chain of events that may include the event and the additional event. For example, identification module 108 may, as part of computing device 202 in FIG. 2, identify, based on determining that the additional data 216 shares the common variable with data 218, a malicious chain of events that may include event 208 and event 212.

The term "malicious chain of events," as used herein, generally refers to any series of events that, in combination, perform a malicious function. For example, a file copy event may not individually be a malicious event and a file encryption event may also not individually be a malicious event. But a file copy event and a file encryption event directed to the same file may be evidence of the actions of malicious ransomware. In another example, a file creation event may not be a malicious event and a registry key creation event may also not be a malicious event, but in combination, the two events may cause a malicious chain of events that causes a potentially malicious process to execute at boot time.

Identification module 108 may identify a malicious chain of events in a variety of ways. For example, identification module 108 may include heuristics for identifying malicious chains of events. In another example, identification module 108 may include pre-set lists of events that, when executed in sequence, form a malicious chain of events. In some examples, identification module 108 may identify a malicious chain of events that includes more than two events that share one or more common variables. For example, identification module 108 may identify a malicious chain of events that includes four events initiated by three processes.

At step 310, one or more of the systems described herein may categorize the uncategorized process as malicious in response to identifying the malicious chain of events. For example, categorization module 110 may, as part of computing device 202 in FIG. 2, categorize process 210 as malicious in response to identifying the malicious chain of events.

Categorization module 110 may take a variety of actions in conjunction with categorizing the process as malicious. For example, categorization module 110 may inform a user and/or administrator that a malicious process has been detected. In another example, categorization module 110 may delete the malicious process. In one embodiment, categorization module 110 may store information about the malicious process so that the malicious process can be recognized in the future. Additionally or alternatively, categorization module 110 may undo any or all of the events in the malicious chain of events. For example, categorization module may delete created files, remove added registry keys, and/or replace moved files.

In some examples, categorization module 110 may categorize the additional process as malicious in response to identifying the malicious chain of events. In some embodiments, categorization module 110 may be more likely to categorize the additional process as malicious if the additional process is a child of the same parent process as the malicious process and/or exhibits suspicious traits, such as being an unrecognized process from an unknown publisher.

In other examples, the additional process may include a trusted process that has been previously categorized by the security application as non-malicious. For example, an uncategorized process may launch reg.exe, a MICROSOFT-signed process, with parameters that direct reg.exe to add a registry key for a process created by the uncategorized process. The systems described herein may detect that the event initiated by reg.exe shares a common variable with the event initiated by the uncategorized process, determine that the uncategorized process is a malicious process, and exonerate reg.exe on the basis of reg.exe being a trusted process.

Figure 5:
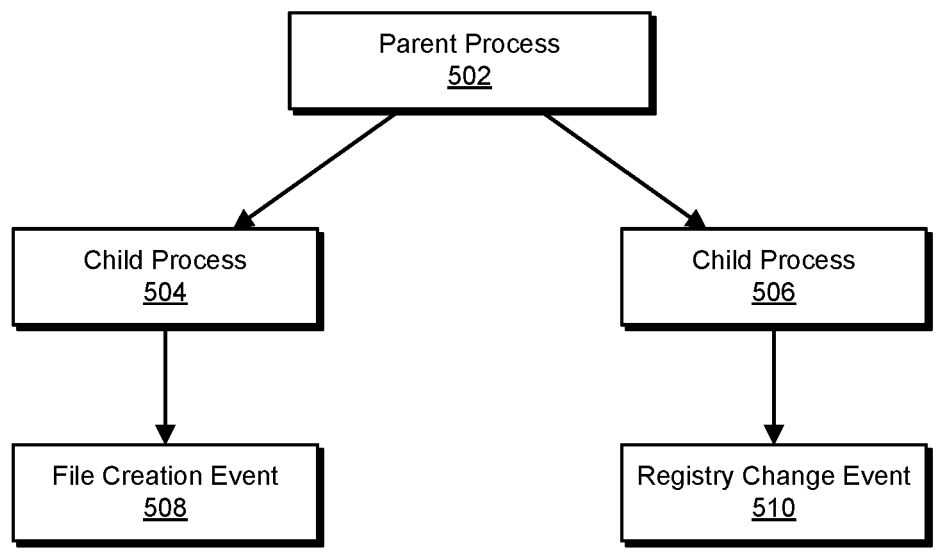
FIG. 5 is a block diagram of an exemplary set of processes.

In one example, the uncategorized process and the additional process may be child processes of a parent process. For example, as illustrated in FIG. 5, a parent process 502 may have a child process 504 and/or a child process 506. In this example, child process 504 may initiate file creation event 508 and/or child process 506 may initiate registry change event 510. In this example, a malicious chain of events may occur but no one process may have initiated more than one suspicious event and parent process 502 may have directly initiated no suspicious events. In some embodiments, if categorization module 110 categorizes a process as malicious, categorization module 110 may also categorize the parent process as malicious and/or remove the parent process.

As explained in connection with method 300 above, the systems and methods described herein may detect malicious processes that may otherwise evade detection. The systems and methods described herein may store event data about events generated by processes in variables in global memory and may use a stateless rules engine to compare event data across processes, allowing the systems described herein to detect malicious activity that is performed by a combination of processes. After determining that a process is involved in a malicious chain of events, the systems and methods described herein may categorize the process as malicious and/or take further security actions.

Figure 6:
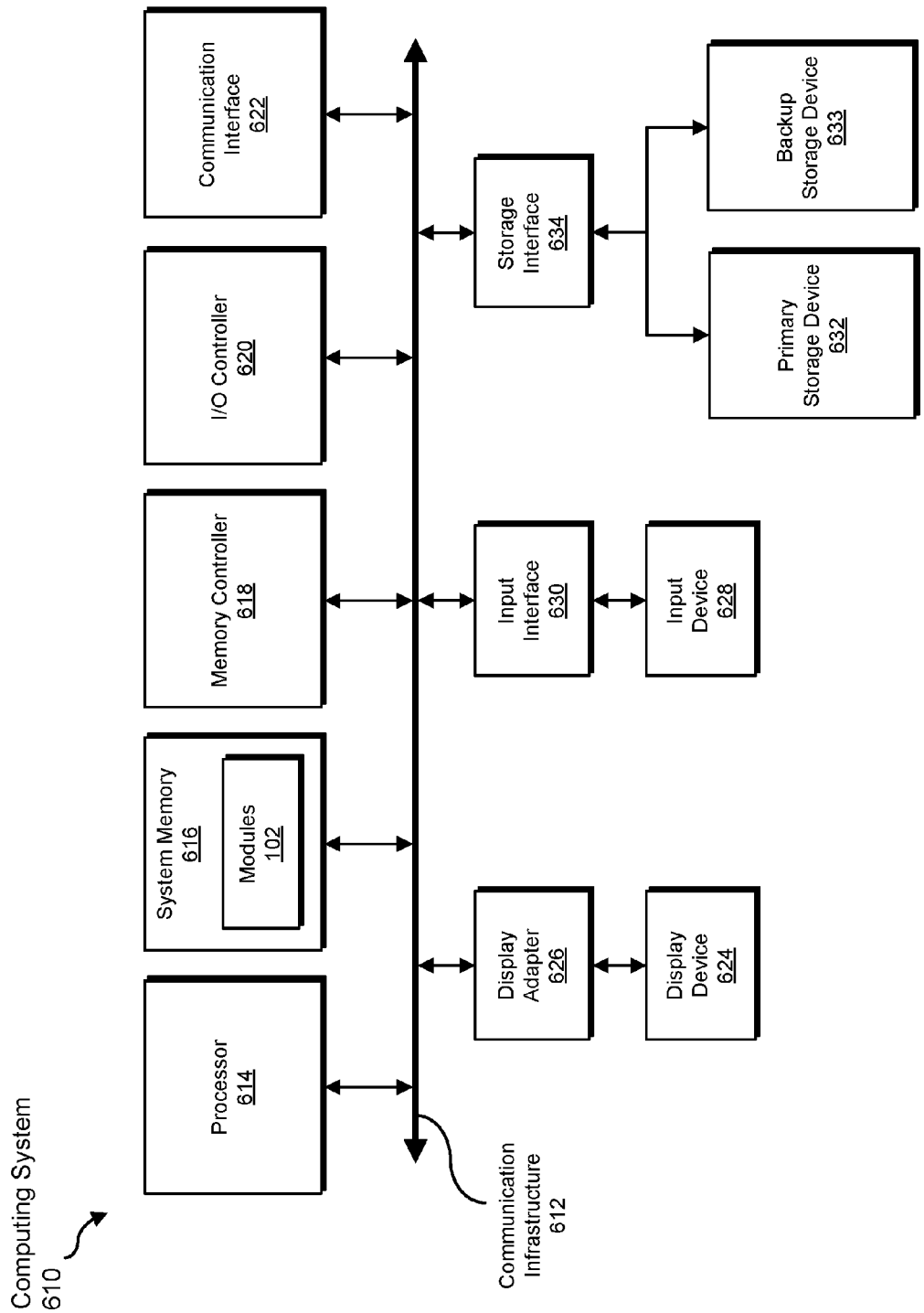
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O)

controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
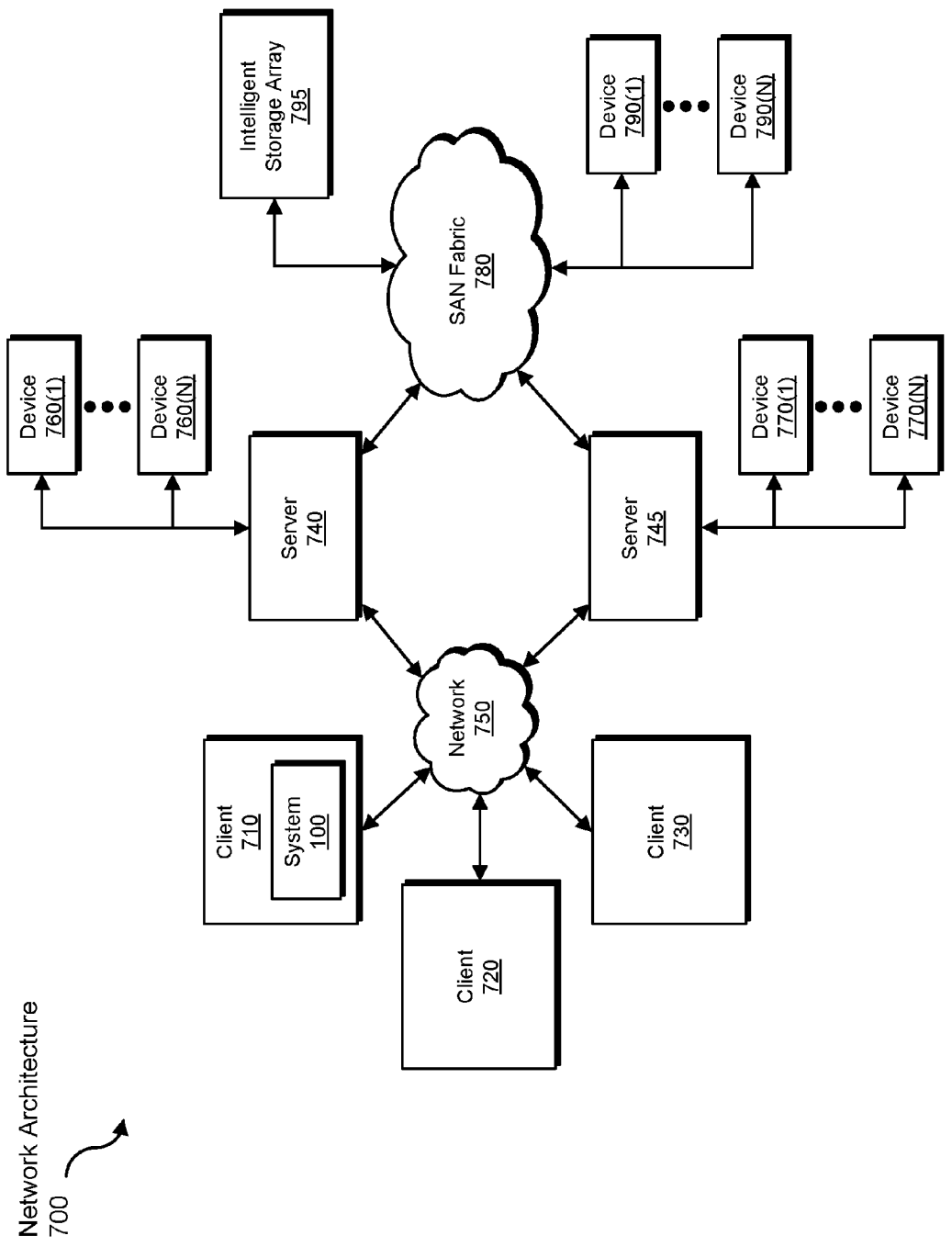
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for categorizing processes as malicious.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive event data to be transformed, transform the event data into a set of variables, output a result of the transformation to global storage, use the result of the transformation to compare data from different events, and store the result of the transformation to global storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components)

connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for categorizing processes as malicious, at least a portion of the method being performed by a computing device comprising at least one processor, the method comprising:
    storing, in a security application that tracks event data for the computing device, data about an event triggered by an uncategorized process on the computing device;
    storing, in the security application, new data about an additional event triggered by an additional process on the computing device that has not previously been determined by the security application to be connected to the uncategorized process;
    comparing the new data about the additional event with the data about the event to determine whether the additional data shares a common variable with the data;
    identifying, based on determining that the additional data shares the common variable with the data, a malicious chain of events that comprises the event and the additional event;
    categorizing the uncategorized process as malicious in response to identifying the malicious chain of events.

2. The computer-implemented method of claim 1, further comprising categorizing the additional process as malicious in response to identifying the malicious chain of events.

3. The computer-implemented method of claim 1, wherein the additional process comprises a trusted process that has been previously categorized by the security application as non-malicious.

4. The computer-implemented method of claim 1, wherein the uncategorized process and the additional process are child processes of a parent process.

5. The computer-implemented method of claim 1, wherein comparing the new data about the additional event with the data about the event comprises using a stateless language to compare the new data against a set of policy rules.

6. The computer-implemented method of claim 1, wherein storing the data comprises storing the data to a variable in global memory.

7. The computer-implemented method of claim 1, further comprising undoing at least one of the event and the additional event.

8. A system for categorizing processes as malicious, the system comprising:
    a storing module, stored in memory, that stores, in a security application that tracks event data for the computing device:
        data about an event triggered by an uncategorized process on the computing device;
        new data about an additional event triggered by an additional process on the computing device that has not previously been determined by the security application to be connected to the uncategorized process;
    a comparison module, stored in memory, that compares the new data about the additional event with the data about the event to determine whether the additional data shares a common variable with the data;
    an identification module, stored in memory, that identifies, based on determining that the additional data shares the common variable with the data, a malicious chain of events that by the event and the additional event;
    a categorization module, stored in memory, that categorizes the uncategorized process as malicious in response to identifying the malicious chain of events;
    at least one physical processor configured to execute the storing module, the comparison module, the identification module, and the categorization module.

9. The system of claim 8, wherein the categorization module categorizes the additional process as malicious in response to identifying the malicious chain of events.

10. The system of claim 8, wherein the additional process comprises a trusted process that has been previously categorized by the security application as non-malicious.

11. The system of claim 8, wherein the uncategorized process and the additional process are child processes of a parent process.

12. The system of claim 8, wherein the comparison module compares the new data about the additional event with the data about the event by using a stateless language to compare the new data against a set of policy rules.

13. The system of claim 8, wherein the storing module stores the data by storing the data to a variable in global memory.

14. The system of claim 8, wherein the categorization module undoes at least one of the event and the additional event.

15. A non-transitory computer-readable medium comprising one or more computer-readable instructions that, when executed by at least one processor of a computing device, cause the computing device to:
    store, in a security application that tracks event data for the computing device, data about an event triggered by an uncategorized process on the computing device;
    store, in the security application, new data about an additional event triggered by an additional process on the computing device that has not previously been determined by the security application to be connected to the uncategorized process;
    compare the new data about the additional event with the data about the event to determine whether the additional data shares a common variable with the data;
    identify, based on determining that the additional data shares the common variable with the data, a malicious chain of events that comprises the event and the additional event;
    categorize the uncategorized process as malicious in response to identifying the malicious chain of events.

16. The non-transitory computer-readable medium of claim 15, wherein the one or more computer-readable instructions cause the computing device to categorize the additional process as malicious in response to identifying the malicious chain of events.

17. The non-transitory computer-readable medium of claim 15, wherein the additional process comprises a trusted process that has been previously categorized by the security application as non-malicious.

18. The non-transitory computer-readable medium of claim 15, wherein the uncategorized process and the additional process are child processes of a parent process.

19. The non-transitory computer-readable medium of claim 15, wherein the one or more computer-readable instructions cause the computing device to compare the new data about the additional event with the data about the event by using a stateless language to compare the new data against a set of policy rules.

20. The non-transitory computer-readable medium of claim 15, wherein the one or more computer-readable instructions cause the computing device to store the data by storing the data to a variable in global memory.

\* \* \* \* \*